Patented Oct. 15, 1935

2,017,070

UNITED STATES PATENT OFFICE 2,017,070

PLASTIC COMPOSITION

Wilbur Arthur Lazier, Roselle, Del., assignor to E. I. du Pont de Nemours & Company, Wilmington, Del., a corporation of Delaware No Drawing. Application March 28, 1934, Serial No. 717,782. In Canada December 19, 1932

11 Claims. (Cl. 106—37)

This invention relates to new compositions of matter, more particularly to esters of octadecanediol and similar high molecular weight glycols, and still more particularly to monocarboxylic acid esters of such glycols and their use in the formation of plastic compositions.

This case is a continuation in part of application Serial No. 584,576, filed January 2, 1932.

This invention has as an object the preparation of esters of octadecanediol and similar glycols. A further object is the preparation of plastic compositions containing these esters. A still further object is the preparation of coating compositions containing these esters. Other objects will appear hereinafter.

These objects are accomplished by the following invention wherein an ester of a high molecular weight glycol, such as octadecanediol, is prepared and utilized in the preparation of a plastic composition containing in addition to the high molecular weight glycol ester, an organic plastic substance containing a plurality of C—O—C linkages.

In the preparation of the esters with which the present invention is concerned, octadecanediol-1,12 or similar glycols containing from 12 to 22 carbon atoms are reacted with monocarboxylic acids or their anhydrides, chlorides or esters thereof, under suitable conditions following which the resulting products are formulated into plasticized compositions.

In the preparation of octadecanediol esters pure octadecanediol may be used, or the crude material largely consisting of octadecanediol which is obtained by the methods described in co-pending application Serial No. 584,576. Monocarboxylic acids in general may be used including aliphatic acids, either branched or straight chain, substituted or unsubstituted, saturated or unsaturated, including acetic, propionic, isobutyric, butyric, branched chain acids corresponding to the higher alcohols obtained as by-products of the methanol synthesis, capric, caprylic, caproic, lauric, levulinic, glycollic, lactic, etc.; aromatic monocarboxylic acids, such as benzoic, benzoylbenzoic, chlorbenzoylbenzoic, and similar acids; cycloparaffinic acids, such as hexahydrobenzoic, octahydracinnamic, cyclohexyl acetic, and the naphthenic acids obtained in the petroleum industry, and heterocyclic acids, such as furoic, picolinic, and similar acids.

Having outlined above the general principles of the preparation of the esters, the following applications of these general principles to certain specific instances are included for purposes of illustration and not limitation.

Example 1

*Octadecanediol-1,12 diacetate.*—A mixture containing 0.1 mole pure octadecanediol-1,12, 0.3 mole acetic anhydride, acetic acid and a small amount of sulfuric acid was refluxed for a few hours. The product was washed with sodium carbonate solution to remove sulfuric acid and excess acetic acid, and heated to about 130° C. at 10 mm. pressure to remove the remaining volatile material. The final product was partially decolorized by treatment with aqueous permanganate solution.

Example 2

*Crude octadecanediol-1,12 diacetate.*—A mixture containing 345 grams crude octadecanediol, 200 grams acetic acid, 300 grams ethylene dichloride and 2 grams sulfuric acid was heated to boiling in an apparatus designed to separate water from the distillate and to return the ethylene dichloride to the reaction vessel. Distillation was continued until the theoretical amount of water had been removed. The product was washed with sodium carbonate solution to remove excess acid and was refined by heating to 130° C. under 50 mm. pressure to remove volatile material. The resulting product was treated with decolorizing carbon and filtered. A light-colored oil resulted.

The crude octadecanediol used in this example consisted of about 25% stearyl alcohol and 75% octadecanediol and was prepared by the two-stage hydrogenation of ethyl ricinoleate described in co-pending application Serial No. 584,576.

Example 3

*Octadecanediol dilaurate.*—A mixture containing 1 gram mole of octadecanediol, 2.2 gram moles methyl laurate, 500 grams toluol, and 5 grams litharge was heated to boiling under a good fractionating column. Distillation was continued until the theoretical amount of methanol-toluol binary had been obtained, indicating complete reaction of the octadecanediol with methyl laurate to produce methanol and octadecanediol dilaurate. The product was filtered to remove litharge and refined by heating to 130° C. at 50 mm. pressure, followed by steaming to remove all traces of volatile material. The resulting product was treated with decolorizing carbon and filtered.

Any of the acids mentioned above may be substituted for the acetic acid or acetic anhydride of Examples 1 and 2, or the methyl ester of any of the acids mentioned above may be substituted for the methyl laurate of Example 3. The acid chloride of any of the above acids may be used to react with octadecanediol. Other dihydric alcohols may be substituted for the octadecanediol of the above examples. Suitable dihydric alcohols includes tetradecanediol - 7,8, dodecanediol - 6,7, cetene glycol, or hexadecanediol-1,2. In general, dihydric alcohols containing from 12 to 22 carbon atoms prepared for example by hydrogenation of the corresponding hydroxy acids or by hydration of corresponding unsaturated monohydric alcohols, such as oleyl or erucyl alcohols, or by peracetylation of suitable olefins may be employed. Any of these dihydric alcohols may be used with any of the above acids in the preparation of esters suitable for use in the manufacture of plasticized compositions. The esters of volatile aliphatic acids are particularly suitable. All of the esters prepared in this manner are substantially non-volatile and are found to be satisfactory plasticizers for cellulose derivatives and certain natural and synthetic resins. They are readily soluble in ordinary organic solvents and are miscible with the other materials commonly used as plasticizers.

Typical coating compositions containing these derivatives as plasticizers are shown in the following examples:

Example 4

|  | Parts |
|---|---|
| Cellulose nitrate | 12 |
| Damar | 3 |
| Octadecanediol dilaurate | 4 |
| Castor oil | 2.6 |
| Solvent | 166 |

Example 5

|  | Parts |
|---|---|
| Polyvinyl acetate | 10 |
| Octadecanediol diacetate | 8 |
| Solvent | 100 |

Example 6

|  | Parts |
|---|---|
| Ethyl cellulose | 10 |
| Rosin ester | 6 |
| Octadecanediol dipropionate | 6 |
| Paraffin wax | 2 |
| Solvent | 170 |

Example 7

|  | Parts |
|---|---|
| Cellulose nitrate | 10 |
| Octadecanediol dinaphthenate | 12 |
| Pigment | 10 |
| Solvent | 50 |

The above lacquers give films which dry in a few minutes. The films are flexible and very durable. By the term "solvent" in the above examples is to be understood suitable mixtures of esters, alcohols, and hydrocarbons, such as is obvious to one skilled in the art.

Typical plastic compositions containing these esters are given in the following examples:

Example 8

|  | Parts |
|---|---|
| Cellulose nitrate | 100 |
| Octadecanediol-1,12 diacetate | 60 |

Example 9

|  | Parts |
|---|---|
| Cellulose nitrate | 100 |
| Octadecanediol-1,12 diacetate | 30–35 |

Example 10

|  | Parts |
|---|---|
| Polymerized methyl methacrylate | 100 |
| Octadecanediol dipropionate | 20 |

Example 11

|  | Parts |
|---|---|
| Polyhydric alcohol-polybasic acid resin | 10 |
| Octadecanediol dicaproate | 2 |

The above plastic compositions may be prepared with or without the usual volatile solvents, for example, alcohol, acetone, or mixtures of toluol-alcohol, etc. Other cellulose derivatives, other natural or synthetic resins, oils and pigments than those mentioned above may be used, including cellulose propionate, cellulose butyrate, cellulose isobutyrate, cellulose crotonate, cellulose acetobutyrate, benzyl cellulose, glycol cellulose, etc., pheno-aldehyde resins, ketone condensation resins, ether resins, etc. It is to be noted that these materials are resinous or quasi-resinous substances containing a plurality of C—O—C linkages, either in the form of ester linkages or ether linkages. While the invention is not to be limited by the theory or explanation here given, it is of interest that the esters of the present invention which are useful as plasticizers contain a plurality of C—O—C linkages themselves, and it may be due to this fact that they are useful as plasticizers for the resinous and quasi-resinous materials themselves containing a plurality of such linkages.

A part of the plasticizer in the compositions given above may be replaced by other plasticizers of the type disclosed in the present invention, or by one or more of the plasticizers hitherto used in the plastic art. Other pigments and/or modifying agents, such as drying oils, semi-drying oils, etc., and organic fillers, such as wood flour, cellulose, etc. may also be included.

The methods for the preparation of the compounds described above are capable of considerable variation, and the invention is not limited to the specific methods described. The following formula is typical of the general type of compound included within the scope of the present invention:

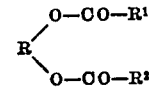

in which R represents a divalent hydrocarbon radical containing 12 to 22 carbon atoms and $R^1$ and $R^2$ represent monovalent organic radicals, including aliphatic, aromatic, heterocyclic, and cycloparaffinic groups, and may be substituted or unsubstituted, branched or straight chain, and $R^1$ and $R^2$ may be different.

The monocarboxylic acid esters of the present invention may be used in the preparation of all types of compositions containing cellulose derivatives, or the natural and synthetic resins of the type above disclosed. They may be used in the preparation of lacquers for coating metal, wood and paper, in dopes for coating fabrics, in moistureproof lacquers for coating regenerated cellulose, in plastic compositions to be used in the preparation of toilet ware, novelties, sheeting, rods, tubes, safety glass interlayers, etc., in lacquers for coating wire screen, and in the preparation of thin sheets for wrapping purposes, thin foils and thin flexible films. They may be used in amounts from 5 to 200% based on the weight of the organic substance being plasticized.

The esters of the present invention are of particular advantage in being extremely high-boiling water-resistant plasticizers. The esters give tough plastic compositions when used with cellulose derivatives, and some of the esters give extremely tough compositions. The products are substantially permanently flexible. The products in general preferred are those derived from octadecanediol-1,12 and similar products derived from hydrogenation of hydroxy acids of suitable molecular weight.

The above description and examples are intended to be illustrative only. Any modification of or variation therefrom which conforms to the spirit of the invention is intended to be included within the scope of the claims.

I claim:

1. Composition of matter comprising a cellulose derivative, and as a plasticizer therefor, a lower aliphatic monocarboxylic acid ester of a dihydric alcohol having from 12 to 22 carbon atoms.

2. Composition of matter comprising a cellulose derivative, and as a plasticizer therefor, a lower aliphatic monocarboxylic acid ester of an octadecanediol.

3. Composition of matter comprising a cellulose derivative, and as a plasticizer therefor, a lower aliphatic monocarboxylic acid ester of octadecanediol-1,12.

4. Composition of matter comprising cellulose nitrate, and as a plasticizer therefor, a lower aliphatic monocarboxylic acid ester of a dihydric alcohol having from 12 to 22 carbon atoms.

5. Composition of matter comprising cellulose nitrate, and as a plasticizer therefor, a lower aliphatic monocarboxylic acid ester of an octadecanediol.

6. Composition of matter comprising cellulose nitrate, and as a plasticizer therefor, a lower aliphatic monocarboxylic acid ester of octadecanediol-1,12.

7. Composition of matter comprising cellulose nitrate, and as a plasticizer therefor, octadecanediol-1,12 diacetate.

8. Composition of matter comprising 100 parts of cellulose nitrate, and as a plasticizer therefor, approximately 30 to 35 parts of octadecanediol-1,12 diacetate.

9. Composition comprising ethyl cellulose and, as a plasticizer therefor, a lower aliphatic monocarboxylic acid ester of a dihydric alcohol having from 12–22 carbon atoms.

10. Composition comprising ethyl cellulose and, as a plasticizer therefor, a lower aliphatic monocarboxylic acid ester of an octadecanediol.

11. Composition comprising ethyl cellulose and as a plasticizer therefor, octadecanediol-1,12 diacetate.

WILBUR A. LAZIER.